United States Patent [19]

Geuens

[11] Patent Number: 4,710,301
[45] Date of Patent: Dec. 1, 1987

[54] WASTEWATER PURIFICATION PROCESS

[75] Inventor: Luc Geuens, Brussels, Belgium

[73] Assignee: S.A. Innovi N.V., Belgium

[21] Appl. No.: 901,649

[22] Filed: Aug. 29, 1986

[30] Foreign Application Priority Data

Sep. 30, 1985 [NL] Netherlands ............... 8502677

[51] Int. Cl.$^4$ ............................................. C02F 3/30
[52] U.S. Cl. ................................. 210/605; 210/630;
210/631; 210/912; 210/917
[58] Field of Search ............ 210/609, 631, 688, 691,
210/912, 917, 605, 603, 630, 502.1, 613, 625,
767-770

[56] References Cited

U.S. PATENT DOCUMENTS

| 2,359,004 | 9/1944 | Schlenz et al. | 210/609 |
| 4,267,049 | 3/1981 | Erickson et al. | 210/609 |
| 4,277,342 | 7/1981 | Hayes et al. | 210/613 |
| 4,342,650 | 8/1982 | Erickson et al. | 210/912 |

FOREIGN PATENT DOCUMENTS

| 110240 | 6/1984 | European Pat. Off. | |
| 666060 | 9/1938 | Fed. Rep. of Germany. | |
| 1911114 | 9/1970 | Fed. Rep. of Germany | 210/609 |
| 59-49900 | 3/1984 | Japan | 210/609 |

OTHER PUBLICATIONS

Dr. Manfred Morper, "Removal of Heavy Metals from Wastewaters by Anaerobic Biosorption", CPP Edition Europe 1985, Sep., pp. 63–67.

Melanie J. Brown and J. N. Lester, "Metal Removal in Activated Sludge: The Role of Bacterial Extracellular Polymers", Public Heath Engineering Laboratory, Imperial College, London, U.K.

*Primary Examiner*—Benoît Castel

[57] ABSTRACT

Wastewater from various sources may be purified by contacting it with sludge derived from an oxidative biological water purification process and subsequently subjected to a complete anaerobic fermentation step followed by a dying-off step. A variety of contaminants such as metals, colorants, detergents, phenols and the like may be absorbed by the sludge in this way and removed from the wastewater by separating the sludge and wastewater after contact. The process may serve as an introductory step to a normal oxidative biological water purification process. In a special embodiment, cationic contaminants are removed from the wastewater with the aid of a sludge of the aforesaid type, while anionic contaminants are removed with the aid of a sludge of the same type that has been pretreated with a cationic detergent.

9 Claims, 4 Drawing Figures

WASTEWATER PURIFICATION PROCESS

BACKGROUND OF THE INVENTION

This invention relates to a process of purifying wastewater and more in particular to a method of removing metals, colorants, detergents, phenols and the like therefrom.

Normal domestic wastewater is conventionally purified with oxidative biological methods, e.g. in oxidation beds, continuous filters, active sludge plants oxidation ditches or biodiscs. Such methods employ micro-organisms which under aerobic conditions are capable of decomposing and removing organic substances from the wastewater.

In the case of an industrial wastewater, such oxidative biological methods cannot be used sometimes because the micro-organisms are sensitive to various components of the wastewater and the process might be inhibited by the presence or a high concentration of such components therein. Therefore, chemical and/or physical purification methods such as precipitation of metals in hydroxide or sulfide form, adsorption of metals to ion exchangers, adsorption of colorants to active carbon, removal of detergents by flocculation, or extraction of phenols with an organic solvent, whether or not in combination with a biological purification process, are frequently used in the case of industrial wastewater. While such methods are generally satisfactory, there is always a need for other methods capable of removing such components from wastewater with high efficiency.

Document EP-A-0 110 240 discloses a method of removing heavy metals from wastewater. This method employs surplus sludge from a normal aerobic biological water purification process which has been subjected to an anaerobic fermentation for some time. The sludge is contacted with the wastewater under anaerobic conditions and appears to be capable of adsorbing heavy metals from the wastewater. After completion of a certain contact period, the sludge together with the heavy metals adsorbed thereon is separated from the wastewater and the remaining wastewater may be discarded or supplied to a normal oxidative biological water purification process.

However, a disadvantage of the method of EP-A-10 110 240 is that the contact period must be a rather long period (up to 24 hours) if it is desired to have a sufficient adsorption of heavy metals from the wastewater. Moreover, the adsorption is effected under anaerobic conditions, and this means that structural provisions must be made to seal the adsorption space from the outside in an airtight way.

An object of the invention is to remove the disadvantages of the method disclosed in EP-A-0 110 240 and to provide a water purification method capable of adsorbing metals from wastewater in a rapid and efficient way, without airtight sealing. Another object is to provide a method permitting an efficient adsorption of colorants, detergents, phenols, and the like from wastewater.

SUMMARY OF THE INVENTION

During an extended search, it has appeared that a rapid and yet efficient adsorption of metals from wastewater may be obtained by employing as an adsorbent sludge from an oxidative biological water purification process that has been subjected to a complete anaerobic fermentation followed by a dying-off period for anaerobic micro-organisms (e.g. by a stay in drying beds). Such sludge is completely stabilized and substantially free of viable micro-organisms then, and appears to have a much higher adsorption capacity for metals than sludge that has been subjected only to an insufficient anaerobic fermentation without a subsequent dying-off period. Moreover, it has been found that this completely fermented and stabilized sludge is capable to adsorb other contaminants such as colorants, detergents, phenols, organic acids, aldehydes, azides, pesticides, aromatics, substituted hydrocarbons and the like from wastewater in addition to metals, which is impossible or hardly possible with the sludge disclosed previously. No anaerobic conditions need be maintained and no airtight sealing of the adsorption space is necessary, thanks to the absence of anaerobic micro-organisms in the sludge, and this is advantageous from a structural point of view.

Thus, the invention provides a method of purifiying wastewater which comprises the following steps: contacting wastewater with sludge of an oxidative biological water purification process that has been subjected to a complete anaerobic fermentation followed by a dying-off period, in order to adsorb metals, colorants, detergents, phenols and the like from the wastewater onto the sludge, and separating the sludge from the wastewater after contact.

The adsorbant employed by the invention is a by-product of the normal oxidative biological purification processes. During such purification processes, a high amount of sludge from micro-organisms is formed under aerobic conditions and such sludge may be stabilized after separation from the water by subjecting it to fermentation under anaerobic conditions in closed containers. A complete fermentation will need a relatively long residence time, e.g. from 20 to 30 days at a temperature from 30°–35° C. and a pH of about 8. Thereupon the stabilized product is frequently stored in drying beds in the open air for some time (e.g. for one or two weeks) resulting into a certain dehydration and thickening and into dying-off of the anaerobic micro-organisms. The resulting end product becomes available in high amounts but until now, it has found only a few utilizations, meaning that it is combusted or discarded frequently. In accordance with the invention, however, it appears to have a high adsorption capacity for metals, colorants, and the like and this offers new utilization possibilities.

In the next part of the specification, the adsorbent employed by the invention will often be indicated as an "anaerobically fermented sludge".

The adsorptive activity of the anaerobically fermented sludge may be ascribed to the presence of extracellular polymers in the sludge. Sludge that has been withdrawn directly from an aerobic water purification process and sludge that has been withdrawn form an anaerobic fermentation process will already comprise a certain amount of extracellular polymers, but sludge that has been subjected to a complete anaerobic fermentation followed by a dying-off period by means of drying beds or the like will have a much higher content of such polymeric substances and this will contribute to the high adsorption capacity. It is will be understood that the invention should not be restricted, however, by such an explanation.

The method of the invention may be effected in a simple way by contacting anaerobically fermented sludge with wastewater and separating it from the water after a certain period of contact. The contacting period need only be short, e.g. from 5 to 20 minutes while 10 minutes is preferred. The mixture of wastewater and sludge may be agitated continuously by means of agitating or mixing means during contact.

Separating the sludge from the water is preferably effected by sedimentation and the sedimentation time will be dependent from the degree of loading of the sludge with adsorbed substances. Thus, the sedimentation time may vary, e.g. between 10 and 30 minutes with an optimum at 20 minutes. Further, a separation by filtration or centrifuging is also possible.

Sedimentation of the sludge may be accelerated by employing polyelectrolytes, i.e. polymeric substances carrying charged functional groups. Non-ionic and anionic polyelectrolytes are preferred. Such polyelectrolytes may be introduced in any desired stage of the process, e.g. at the start of the sedimentation stage or during the stage of contact or earlier. Perhaps, it might be possible to add the polyelectrolytes already to the sludge in the drying beds. The concentration of polyelectrolytes in the mixture of wastewater and sludge may vary between 1 and 10 ppm with an optimum value at 5 ppm. In this way, the sedimentation efficiency may be improved by 75%.

The whole process, from the addition of the anaerobically fermented sludge up to the separation of the sludge, may be effected in a continuous or a discontinuous way. The separated sludge may be reused one or more times until a point of saturation has been reached and may be processed later for recovering metals, colorants, detergents and the like. The separated wastewater may be discarded, stored or purified further.

Further purification of the wastewater after separation of the anaerobically fermented sludge from it may be effected in principle in different ways. The most suitable purification method for this purpose will mostly be selected based on the contaminants still present. In the special case that the wastewater still contains a high percentage of dissolved organic substances derived from normal domestic wastewater, an oxidative biological purification process can be selected advantageously for the further purification. The total process will comprise at least two steps then, viz. a first step for the removal of metals, colorants, detergents, and the like with the aid of anaerobically fermented sludge and a second step for the digestion of dissolved organic substances with the aid of oxidative-biological methods, e.g. in oxidation beds, biodiscs, an active sludge plant or an oxidation ditch. This embodiment has the advantage that all substances capable of inhibiting the second step, will be adsorbed and removed now by the anaerobically fermented sludge in the first step such that a distinct efficiency improvement in the oxidative biological process of the second step can be achieved. Moreover, if the inhibitory substances were toxic products such a metals, then an additional advantage is that the sludge resulting from the second step is not contaminated with toxic substances and may be used without any objection for manuring purposes in agriculture.

The method of the invention employing anaerobically fermented sludge may be used for removing various different substances from wastewater. Examples thereof are cationically dissolved substances such as metal cations, cationic colorants and cationic detergents, and moreover non-ionically dissolved and semi-dissolved substances as dispersion and reaction colorants, aldehydes, aromatics and substituted hydrocarbons. The anaerobically fermented sludge may be used without any special pretreatment for all these substances and the adsorption mechanism is presumably based upon an interaction with charged portions of the extracellular polymers from the sludge and upon occlusion phenomena.

Anionic substances (chromates, anionic colorants, anionic detergents, phenols, organic acids, azides, pesticides, and the like) may also be adsorbed by the anaerobically fermented sludge provided that it has been subjected to a pretreatment with a cationic detergent such as e.g. benzalkonium chloride or cetyltrimethylammonium bromide. The cationic detergent adhears presumably to the sludge in such a way that its cationic portion will remain freely available, thus permitting adsorption of anionic substances from the wastewater. The anaerobic sludge treated with cationic detergents can still be separated easier than untreated anaerobic sludge from the aqueous medium by sedimentation or the like.

The pretreatment of the anaerobically fermented sludge with cationic detergent may simply be effected by contacting the sludge with the detergent. The required amount of cationic detergent is dependent from many factors such as e.g. the nature and amount of the anionic substances to be removed and can best be determined experimentally. Lower amounts than the optimum amount have insufficient effects and higher amounts than the optimum amount have the disadvantage that the sedimentation capacity of the sludge will deteriorate.

Moreover, account should be taken of the fact that part of the amount of cationic detergent is not adsorbed by the sludge but will remain in dissolved state near the sludge. This part of the cationic detergent will mix with the wastewater to be purified and may be removed from it later in a separate operation.

The adsorption capacity if the anaerobically fermented sludge for anionic substances may be improved further by employing aluminum (III) ions or iron (III) ions during pretreatment of the sludge with cationic detergents.

BRIEF DESCRIPTION OF THE DRAWING

The invention is further illlustrated by the drawing, showing some embodiments in a schematic way.

DESCRIPTION OF THE PREFERRED EMBODIMENTS

Figure 1:
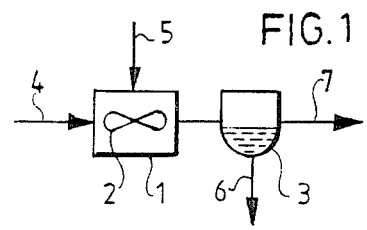
FIG. 1 shows a simple arrangement for removing metals, colorants, detergents, phenols etc. from wastewater.

The arrangement of FIG. 1 may serve can be found in sequence a mixing station 1 with agitator 2 and a sedimentation station 3. The wastewater is supplied through conduit 4 to the mixing station 1 and will contact there an amount of anaerobically fermented sludge supplied through conduit 5. After a contact period of sufficient length, the mixture arrives in the sedimentation station 2 where the sludge is separated by sedimentation and discharged through conduit 6. Should the wastewater as supplied have a content of dissolved metals in it, then the sludge discharged through conduit 6 is loaded with such metals. It may be reused one or more times for the same purpose or it may be subjected to a process for recovery of the metals. The wastewater discharged through conduit 7 is substantially free from metals.

The arrangement may not only be used for removing metals, but also for removing colorants, detergents, phenols and the like from wastewater. Should any anionic substances be involved, then the anaerobic sludge supplied through conduit 5 should have been pretreated with a cationic detergent.

Figure 2:
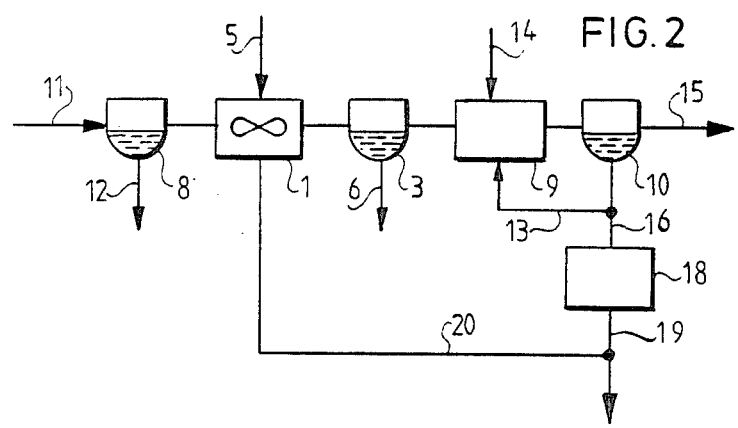
FIG. 2 shows a two-step arrangement: a step for removing metals, colorants etc. with anaerobically fermented sludge and a step for further purifying the wastewater with oxidative biological methods.

FIG. 2 shows an arrangement adapted for the purification of domestic wastewater in two stages. When seen in the flow direction of the water (from left to right) there are in succession a presedimentation station 8, a mixing station 1, a sedimentation station 3, an aeration station 9 and a resedimentation station 10. The wastewater supplied through conduit 11 is freed from suspended substances in the presedimentation station 8 whereupon such substances are discharged through conduit 12. Anaerobically fermented sludge from conduit 5 is admixed to the water in mixing station 1 in order to remove metals, colorants, detergents etc. from it. After a certain contact period, the sludge is allowed to sediment in station 3 and withdrawn through conduit 6. This sludge has been loaded then with metals, colorants, detergents or the like, as far as such substances were present in the wastewater. Activated sludge is added to the water in station 9 through conduit 13 and the mixture is allowed to pass this station under continuous aeration (via 14). Next, the acitve sludge is separated from the water in the resedimentation station 10 and discharged through conduit 16 whilst purified water leaves the arrangement through conduit 15. Part of the active sludge (which in the meantime has increased in amount) is recycled to aeration station 9 through return conduit 13. Another part is passed to a sedimentation station 18 where it is completely fermented and stabilized under anaerobic conditions. The fermented sludge is discharged through conduit 19 while part thereof is passed to mixing station 1 through return conduit 20 in order to adsorb metals, colorants, etc. from freshly supplied wastewater.

Figure 3:
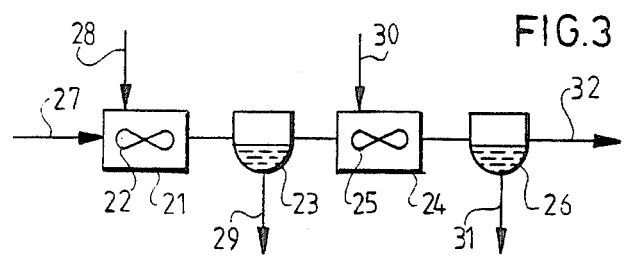
FIG. 3 shows an arrangement adapted for sequentially removing cationic and anionic metals as well as metal complexes, colorants, detergents and the like from wastewater.

The arrangement of FIG. 3 is adapted for sequentially removing cationically and anionically dissolved metals as well as metal complexes, colorants, detergents and the like from wastewater. When seen in the flow direction of the wastewater (from left to right) there are in succession a mixing station with agitator 22, a sedimentation station 23, a second mixing station 24 with agitator 25 and a second sedimentation station 26. The wastewater from conduit 27 is contacted in the first mixing station 21 with anaerobically fermented sludge supplied through conduit 28. After a certain contact period, the mixture is allowed to sediment in station 23 whereupon the sludge (loaded with cationic metals, colorants, detergents and the like in the meantime), is withdrawn through conduit 29. The wastewater flowing through mixing station 24 is mixed therein with anaerobically fermented sludge from conduit 30, said sludge having been pretreated with a cationic detergent. After a certain contact period, the latter sludge, loaded in the meantime with anionic colorants, detergents, phenols and the like, is separated in sedimentation station 26 and removed through conduit 31. Both types of sludge (from 23 and 26) may also contain non-ionic and semidissolved colorants, detergents and the like and may be reused for the same purpose if desired. As an alternative, the sludge from conduit 29 may be processed to recover metals, colorants, detergents and the like. Wastewater liberated from metals, colorants, detergents and the like, as far as initially present, is discharged through conduit 32.

Since the water discharged from the arrangement of FIG. 3 will still contain some cationic detergent in dissolved state originating from the pretreated sludge introduced through conduit 30, it may be advisory to have this water further purified. The variant of FIG. 4 may be used for this purpose.

Figure 4:
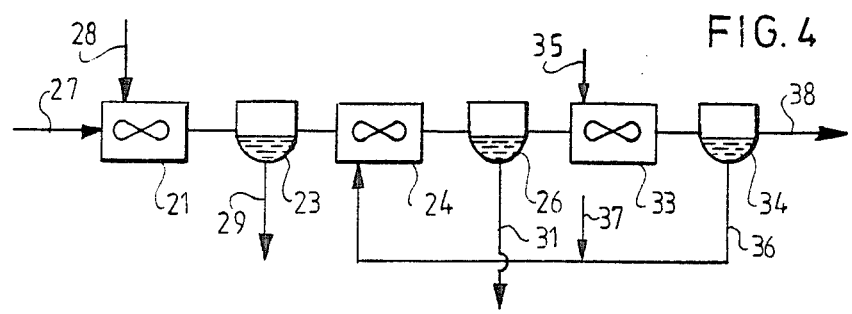
FIG. 4 shows a variant to the arrangement of FIG. 3.

The arrangement of FIG. 4 differs from that of FIG. 3 by the fact that the sludge pretreated with cationic detergent is prepared within the arrangement itself and by the fact that withdrawal of free cationic detergent with the wastewater is prevented. When seen in the flow direction of the wastewater (from left to right) there are in succession again a mixing station 21, a sedimentation station 23, a second mixing station 24 and a second sedimentation station 26, followed by a third mixing station 33 and a third sedimentation station 34. Stations 21, 23, 24 and 26 operate in the same way as those of FIG. 3. In the third mixing station, the wastewater (liberated in the meantime from cationic and anionic metals, colorants, detergents etc. as far as initially present) is mixed with anaerobically fermented sludge from conduit 35 in order to have the sludge adsorb dissolved cationic detergent from the water. The sludge pretreated with detergent in this way is separated in the third sedimentation station 34 and recycled to the second mixing station 24 through return conduit 36. An additional amount of cationic detergent is admixed to it through conduit 37. At the end of the arrangement, wastewater substantially free from cationic and anionic metals, colorants, detergents, phenols etc. is discharged through conduit 38.

It will be clear from the preceding lines that the process of the invention is excellently suitable to remove metals, colorants, detergents, phenols etc. from wastewater with high efficieny and in an economical way. Moreover, it will be clear that this process can be utilized in many fields of the art. Some examples of such utilizations are:

removal of heavy or noble metals from wastewater produced by galvanizing plants, tanneries, electronic and photographic industries and non-ferro industries, optionally with recuperation of such metals, removal of metals, colorants and/or detergents from normal domestic wastewater as an introductory step to the normal purification of water with oxidative biological methods (FIG. 2), removal of colorants from wastewater of textile industries, pharmaceutical industries or paper industries, removal of detergents and phenols from wastewater of cleaning stations, removal of pesticides, aromatics, azides, aldehydes, organic acids and the like from other types of industrial wastewater, removal and optional recovery of uranyl ions from wastewater of the atomic industry, detoxication of industrial wastewater which is supplied to purification systems for domestic wastewater.

What I claim is:

1. A process for the purification of wastewater to remove metals, colorants, detergents, phenols and other cationic contaminates comprising the steps of:
   (a) contacting for about 5 to 20 minutes said wastewater with completely anaerobic fermented oxidative biological water purification sludge which has been fermented for at least 20 days and is substantially free of viable micro-organisms in order to adsorb metals, colorants, detergents, phenols and cationic contaminates from said wastewater onto said sludge, and
   (b) separating said sludge from said wastewater after said contact.

2. A process as claimed in claim 1, wherein said wastewater is contacted with said sludge for a period from 10 to 20 minutes.

3. A process as claimed in claim 1, wherein said wastewater is contacted with said sludge for a period of about 5 minutes.

4. A process as claimed in claim 1, wherein said wastewater is further purified after separation of said sludge from it by subjecting it to an oxidative biological water purification process.

5. A process as claimed in claim 1, wherein metal cations, cationic colorants and cationic detergents are adsorbed from wastewater by an agent consisting of sludge.

6. A process as claimed in claim 1 wherein said separating is effected by sedimentation.

7. A process for the purification of wastewater to remove anionic metal compounds as well as anionic colorants, detergents, phenols and other anionically dissolved substances comprising the steps of contacting for about 5 to 20 minutes said wastewater with completely anaerobic fermented oxidative biological purification sludge which has been fermented for at least 20 days and is substantially free of viable micro-organisms and that has been subjected to treatment with a cationic detergent in order to adsorb said anionic substances from said wastewater onto said sludge, and separating said sludge from said wastewater after said contact.

8. A process as claimed in claim 7, wherein said sludge has been treated with a cationic detergent and with aluminum (III) ions or iron (III) ions.

9. A process for the purification of wastewater to removal cationic and anionic contaminants comprising the sequential steps of:
   (a) contacting for about 5 to 20 minutes said wastewater with completely anaerobic fermented oxidative biological water purification sludge, which has been fermented for at least 20 days and is substantially free of viable micro-organisms in order to absorb metals, colorants, detergents, phenols and other cationic contaminants from said wastewater onto said sludge, and
   (b) separating said sludge from said wastewater after said contact, and
   (c) thereafter contacting said wastewater with completely anaerobic fermented oxidative biological water purification sludge which has been fermented for at least 20 days and is substantially free of viable microorganisms and which has been subjected to treatment with a cationic detergent, to adsorb anionic metal compounds as well as anionic colorants, detergents, phenols and other anionically dissolved substances.

* * * * *